US012792428B2

(12) United States Patent
Xie et al.

(10) Patent No.: US 12,792,428 B2
(45) Date of Patent: Nov. 10, 2026

(54) METHOD AND APPARATUS WITH CHECKPOINT ADJUSTMENT

(71) Applicant: SAMSUNG ELECTRONICS CO., LTD., Suwon-si (KR)

(72) Inventors: Fengtao Xie, Xi'an (CN); Huiru Deng, Xi'an (CN); Lu Wei, Xi'an (CN); Biao Xing, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 501 days.

(21) Appl. No.: 18/475,683

(22) Filed: Sep. 27, 2023

(65) Prior Publication Data

US 2024/0220340 A1 Jul. 4, 2024

(30) Foreign Application Priority Data

Dec. 30, 2022 (CN) ......................... 202211719826.4
Jun. 12, 2023 (KR) ......................... 10-2023-0074992

(51) Int. Cl.
*G06F 9/54* (2006.01)

(52) U.S. Cl.
CPC .................................... *G06F 9/542* (2013.01)

(58) Field of Classification Search
CPC ............................... G06F 9/542; G06F 11/302
See application file for complete search history.

(56) References Cited

U.S. PATENT DOCUMENTS 7,392,433 B2 6/2008 Sahoo et al.
9,348,710 B2 5/2016 Al-Wahabi
9,836,354 B1 * 12/2017 Potlapally ........... G06F 11/1438
10,275,851 B1 * 4/2019 Zhao ....................... G09G 5/363
10,623,281 B1 * 4/2020 Zhao ................... H04L 43/0805
11,016,861 B2 * 5/2021 Chung ................ G06F 11/1471
2019/0324856 A1 * 10/2019 Zhao ....................... G06N 3/098
2020/0174840 A1 * 6/2020 Zhao ....................... G06N 3/084
2021/0240570 A1 * 8/2021 Upadhyay ........... G06F 11/1448

(Continued)

FOREIGN PATENT DOCUMENTS

KR 10-2022480 B1 9/2019
KR 10-2022481 B1 9/2019

OTHER PUBLICATIONS

"Checkpoint/Restart in Practice: When 'Simple is Better'" listed in IDS filed on Sep. 27, 2023, hereinafter El-Sayed (Year: 2023).*

(Continued)

*Primary Examiner* — Sisley N Kim
(74) *Attorney, Agent, or Firm* — NSIP Law

(57) ABSTRACT

A method and apparatus for adjusting a checkpoint are provided. The method includes monitoring calls of an application program interface (API) that are called when an accelerator device executes an application, and by the monitoring, checking an API execution logic and a current API execution cycle of the application with respect to the accelerator device; and determining a next checkpoint according to a checkpoint adjustment strategy that determines the next checkpoint based on the API execution logic and based on the current API execution cycle of the application, wherein the checkpoint adjustment strategy corresponds to at least one API execution logic among plural API execution logics.

20 Claims, 7 Drawing Sheets

(56) References Cited

U.S. PATENT DOCUMENTS

| | | | | |
|---|---|---|---|---|
| 2022/0342761 | A1* | 10/2022 | Hukerikar | G06F 9/3888 |
| 2023/0138337 | A1* | 5/2023 | Mufti | G06F 11/1461<br>711/162 |
| 2024/0220340 | A1* | 7/2024 | Xie | G06F 11/302 |

OTHER PUBLICATIONS

"Design of an adaptive GPU sharing and scheduling scheme in container-based cluster," 2019, hereinafter Chen (Year: 2019).*

Young et al. "A First Order Approximation to the Optimum Checkpoint Interval" *Communications of the ACM*, vol. 17 No. 9. 1974 (pp. 530-531).

El-Sayed et al. "Checkpoint/Restart in Practice: When 'Simple is Better" *2014 IEEE International Conference on Cluster Computing (Cluster)*. IEEE, 2014. (pp. 1-9).

Martino et al. "Lessons Learned From the Analysis of System Failures at Petascale: The Case of Blue Waters" *2014 44th Annual IEEE/IFIP International Conference on Dependable Systems and Networks*. IEEE, 2014 (pp. 1-12).

Mohan et al. "CheckFreq: Frequent, Fine-Grained DNN Checkpointing" *19th USENIX Conference on File and Storage Technologies* Feb. 23-25, 2021 (pp. 202-216).

* cited by examiner

METHOD AND APPARATUS WITH CHECKPOINT ADJUSTMENT

CROSS-REFERENCE TO RELATED APPLICATIONS

This application claims the benefit under 35 USC § 119(a) of Chinese Patent Application No. 202211719826.4, filed on Dec. 30, 2022, in the China National Intellectual Property Administration, and Korean Patent Application No. 10-2023-0074992, filed on Jun. 12, 2023, in the Korean Intellectual Property Office, the entire disclosures of which are incorporated herein by reference for all purposes.

BACKGROUND

1. Field

The following description relates to the field of computer science, and more particularly, to a method and apparatus with checkpoint adjustment.

2. Description of Related Art

High performance computers (HPCs) may often need to restart due to various errors and then recover computing processes interrupted by the restarting. Such errors may be software errors and hardware errors. Examples of software errors include an application error, an operating system error (e.g., a kernel panic), a communication library error, a file system error, and the like. Examples of hardware errors include hard disk damage, processor damage, a memory error, a network error, and the like.

The issue of fault-tolerance issue for HPCs has been addressed through the checkpoint method, which saves an intermediate state of an executing application. The checkpointed state can be used to quickly recover the execution process of the application in the event of a restart. Existing checkpoint methods include a checkpoint method based on a central processing unit (CPU) and a checkpoint method based on an accelerator device such as a graphics processing unit (GPU), a field-programmable gate array (FPGA), and the like. That is, different processing devices may be individually checkpointed, sometimes using checkpointed facilities of the processing devices.

To introduce an additional accelerator device during a computing process, it may be practical to have a process of copying to-be-processed data from a CPU to the accelerator device for computing thereby, copying result data from the accelerator device to the CPU after computing is completed, and performing a post-processing operation.

Therefore, the accelerator device may require additional data synchronization, and as the amount of data to be synchronized increases, the time for performing same may increase significantly. During the execution of a checkpoint capture, since the data synchronization quickly saves/recovers the state and data of the accelerator device, a lot of iterative synchronization processes inevitably result in excessive cost of the checkpoint. In addition, in accelerator device applications (applications running on accelerator devices), since checkpoint costs vary at different time points, performance differences at different times can be significant.

For the current situation described above, disadvantages of the existing checkpoint method may be as follows. There may be limited universality since it is applicable only to specific application scenarios. Since performance is different in different applications, it easily leads to a high checkpoint load. The design of the algorithm is not correct since a load change during the execution of an application is not accounted for.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a method and apparatus for adjusting a checkpoint.

In one general aspect, a method of adjusting a checkpoint includes: monitoring calls of an application program interface (API) that are called when an accelerator device executes an application, and by the monitoring, checking an API execution logic and a current API execution cycle of the application with respect to the accelerator device; and determining a next checkpoint according to a checkpoint adjustment strategy that determines the next checkpoint based on the API execution logic and based on the current API execution cycle of the application, wherein the checkpoint adjustment strategy corresponds to at least one API execution logic among plural API execution logics.

The checkpoint adjustment strategy may be determined on at least one API execution cycle based on the API execution logic of the application executed by the accelerator device and an initial checkpoint interval.

The at least one API execution cycle may include a high-load API for copying data to or from the accelerator device.

The API execution logic of the application may include an order of API calls when the accelerator device executes the application and a time required to execute each of the API calls.

The initial checkpoint interval may be determined based on a mean time to failure (MTTF) and a checkpoint cost.

The method may further include setting the checkpoint adjustment strategy, wherein the setting of the checkpoint adjustment strategy may include: pre-executing the application with the initial checkpoint interval; and setting, when a first time difference is not greater than the initial checkpoint interval of a predetermined ratio and a second API call is not within the initial checkpoint interval, when the first time difference is less than a predetermined multiple of a second time difference, a call time of a first API call as a next checkpoint, wherein, within a time interval between a first checkpoint and a second checkpoint, the first time difference is a time difference between the call time of the first API call and the second checkpoint, the second time difference is a time difference between the second checkpoint and a call time of the second API call, the first API call is a last API call that copies data into the accelerator device within the time interval between the first checkpoint and the second checkpoint, and the second API call is a next API call after the first API call that copies data from the accelerator device.

The method may further include setting the checkpoint adjustment strategy, wherein the setting of the checkpoint adjustment strategy includes: pre-executing the application with the initial checkpoint interval; and setting, when a first time difference is not greater than a predetermined ratio of the initial checkpoint interval, when a second API call is not within the initial checkpoint interval, and when the first time difference is greater than or equal to a predetermined multiple of a second time difference, a call time of the second API call as a next checkpoint, wherein, within a time interval between a first checkpoint and a second checkpoint, the first time difference is a time difference between the call time of the first API call and the second checkpoint, the second time difference is a time difference between the second checkpoint and a call end time of the second API call, the first API call is a last API call, within the time interval between the first checkpoint and the second checkpoint, that copies data into the accelerator device, and the second API call is a next API call after the first API call that copies data from the accelerator device.

The high-load API may include an API function for copying data into the accelerator device and an API function for copying data from the accelerator device.

The accelerator device may be a graphics processing unit (GPU) and the application may be a GPU application, the API function for copying data into the accelerator device may be cuMemcpyHtoD, and the API function for copying data from the accelerator device may be cuMemcpyDtoH.

The accelerator device may be a CUDA GPU, and a checkpoint of the CUDA GPU may be performed according to the next checkpoint.

In one general aspect, an apparatus for adjusting a checkpoint includes: one or more processors; memory storing instructions configured to be executed by the one or more processors to cause the one or more processors to: monitor an application program interface (API) execution cycle configured to identify calls to the API that are made when an accelerator device executes an application and check an API execution logic and a current API execution cycle of the application; determine a next checkpoint according to a checkpoint adjustment strategy based on the API execution logic and the current API execution cycle of the application; and according to the determined next checkpoint, perform a checkpoint of the application, including checkpointing data stored in the accelerator device.

The checkpoint adjustment strategy may be determined on at least one API execution cycle based on the API execution logic of the application and an initial checkpoint interval.

The at least one API execution cycle may include a high-load API for copying data to and from the accelerator device.

The API execution logic of the application may include an order of calls to the API when the accelerator device executes the application and a time required to execute each of the API calls.

The initial checkpoint interval may be determined based on a mean time to failure (MTTF) and a checkpoint cost.

The instructions may be further configured to cause the one or more processors to pre-execute the application with the initial checkpoint interval and, when a first time difference is not greater than a predetermined ratio of the initial checkpoint interval and a second API call is not within the initial checkpoint interval, when the first time difference is less than a predetermined multiple of a second time difference, set a call start time of a first API call as a next checkpoint, wherein, within a time interval between a first checkpoint and a second checkpoint, the first time difference is a time difference between the call start time of the first API call that is included in an execution cycle of the first API call within the time interval and the second checkpoint, the second time difference is a time difference between the second checkpoint and a call end time of the second API call, the first API call is a last API call that, within the time interval between the first checkpoint and the second checkpoint, copies data into the accelerator device, and the second API call is a next API call after the first API call that copies data from the accelerator device.

When a first time difference is not greater than the predetermined ratio of the initial checkpoint interval of and a second API call is not within the initial checkpoint interval, and when the first time difference is greater than or equal to a predetermined multiple of a second time difference, a call time of the second API call may be set as a next checkpoint.

The high-load API may include a function for copying data into the accelerator device and a function for copying data from the accelerator device.

The accelerator device may be a graphics processing unit (GPU), the function for copying data into the accelerator device may be cuMemcpyHtoD, and the function for copying data from the accelerator device may be cuMemcpyDtoH.

Other features and aspects will be apparent from the following detailed description, the drawings, and the claims.

Figure 1:
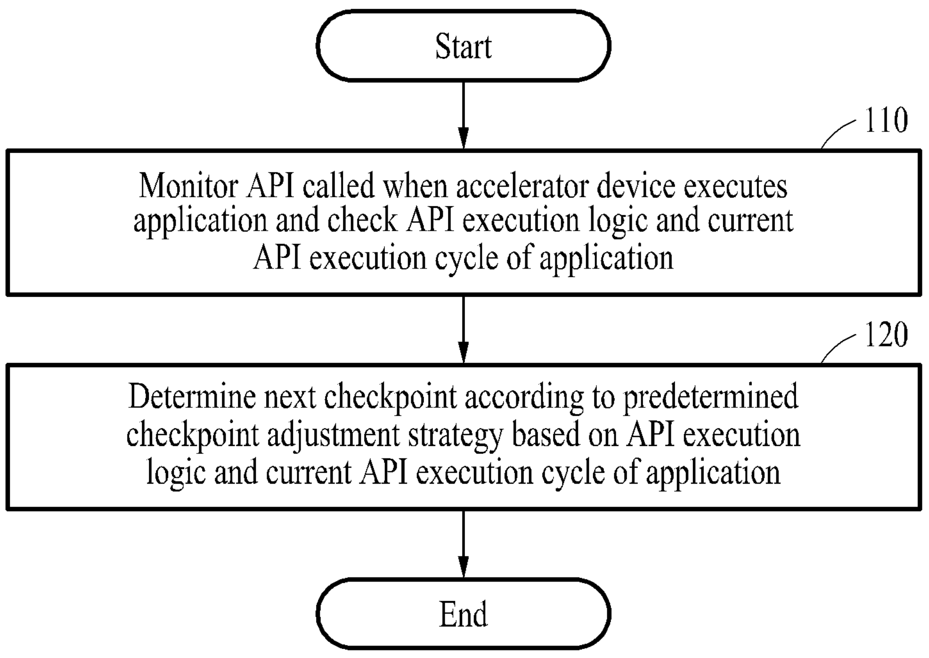
FIG. 1 illustrates an example process of adjusting a checkpoint in a computing apparatus, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, a method and apparatus for adjusting a checkpoint are described in detail with reference to FIGS. 1 to 8.

An accelerator device application (e.g., a GPU application) may have a distinct periodic repetition (i.e., an API execution cycle) in an execution process and entails a relatively time-consuming data synchronization operation (e.g., cuMemcpyHtoD, cuMemcpyDtoH, etc.), and it is possible to monitor load changes in real time during the execution of the application and determine a next checkpoint according to a predetermined checkpoint adjustment strategy, thereby effectively reducing a checkpoint cost.

In addition, in some implementations, when determining the next checkpoint according to a high-load API, checkpoints near the high-load API may be avoided. In addition, checkpoint setting techniques described herein may have higher flexibility and universality since they are applicable to various accelerator device applications. In addition, in unified virtual memory (UVM) technology, although there is no obvious memory copy call during the execution of the application, a lower layer still uses data interaction and memory copy between a central processing unit (CPU) and the accelerator device, so techniques described herein may be applicable to a scenario using UVM.

FIG. 1 illustrates an example of adjusting a checkpoint, according to one or more embodiments.

Referring to FIG. 1, in operation 110, a computing apparatus may monitor (or intercept) an application program interface (API) call that is invoked when an accelerator device executes an application and check an API execution logic and a current API execution cycle of the application.

Here, the computing apparatus may monitor an execution location of an API of an accelerator device. The computing apparatus may find the execution location by checking a name of whichever API (or library providing/exposing same) is currently being executed in an application layer through an API package structure (e.g., a wrapper library). The computing apparatus may load a data connection library (lib) of the API package structure through two processes in one address space using a process-in-process technology. For example, a process-in-process implementation may load a wrapper library (e.g., WrapperLib) through a first process and load an actual library (lib) through a second process, and thus may be used for intercepting calls and profiling an arbitrary application. Here, the accelerator device may include a graphics processing unit (GPU), a field-programmable gate array (FPGA), a processing-in-memory memory device, and the like but is not limited thereto.

Incidentally, process-in-process is generally an architecture where multiple processes are mapped into a single virtual address space. Each process may own its respective process-private storage but can directly access the private storage of other processes in the same virtual address space. A process-in-process implementation may resided in user space, thus lending itself to portability, particularly with respect to HPC systems.

In addition, as described in more detail below, in operation 120, the computing apparatus may determine a next checkpoint time/location/interval according to a predetermined checkpoint adjustment strategy that is determined or selected based on the API execution logic and the current API execution cycle of the application.

The predetermined checkpoint adjustment strategy may correspond to at least one API execution logic among various API execution logics. That is, the computing apparatus may (i) search for (and find) the checkpoint adjustment strategy according to the current API execution cycle, which is monitored on-the-fly during execution time and, (ii) when it is determined that adjusting the next checkpoint is required, adjust a current initial checkpoint interval with the found checkpoint adjustment strategy. If a checkpoint adjustment strategy is not found, the computing apparatus may forego adjusting the current initial checkpoint interval. The checkpoint interval is an interval at which a checkpoint is taken.

The predetermined checkpoint adjustment strategy may be determined (or found) on at least one API execution cycle based on the API execution logic of the application executed by the accelerator device and an initial checkpoint interval. However, examples are not limited thereto. Here, the at least one API execution cycle may correspond to a high-load API that is invokable for copying data of the accelerator device, e.g., for copying data to/from the accelerator device.

More specifically, when setting the checkpoint adjustment strategy in advance, the computing apparatus may execute an accelerator device application (an application that executes at least in part on the accelerator device) for a specific time period (e.g., several minutes to several hours) to obtain the API execution logic for the specific time period. Here, the API execution logic for the specific time period may include all API execution cycles of the accelerator device application.

Here, since the execution process of the accelerator device application (an application executed by the accelerator device, for example, a GPU application) is periodically repeated, all API execution cycles for the specific time period may be obtained. For example, when the API executed by the accelerator device application includes a first API execution cycle, a second API execution cycle, and a third API execution cycle (each API execution cycle may include a preset number of APIs) that are sequentially executed in cycles, the API execution logic for the specific time period may need to include the first API execution cycle, the second API execution cycle, and the third API execution cycle. Here, the API execution logic may include an order of calling APIs when the accelerator device executes the application and a time required to execute each of the APIs. However, examples are not limited thereto. In addition, when the accelerator device application is a GPU, an API execution logic of the GPU application may be obtained using an analysis tool.

Figure 2:
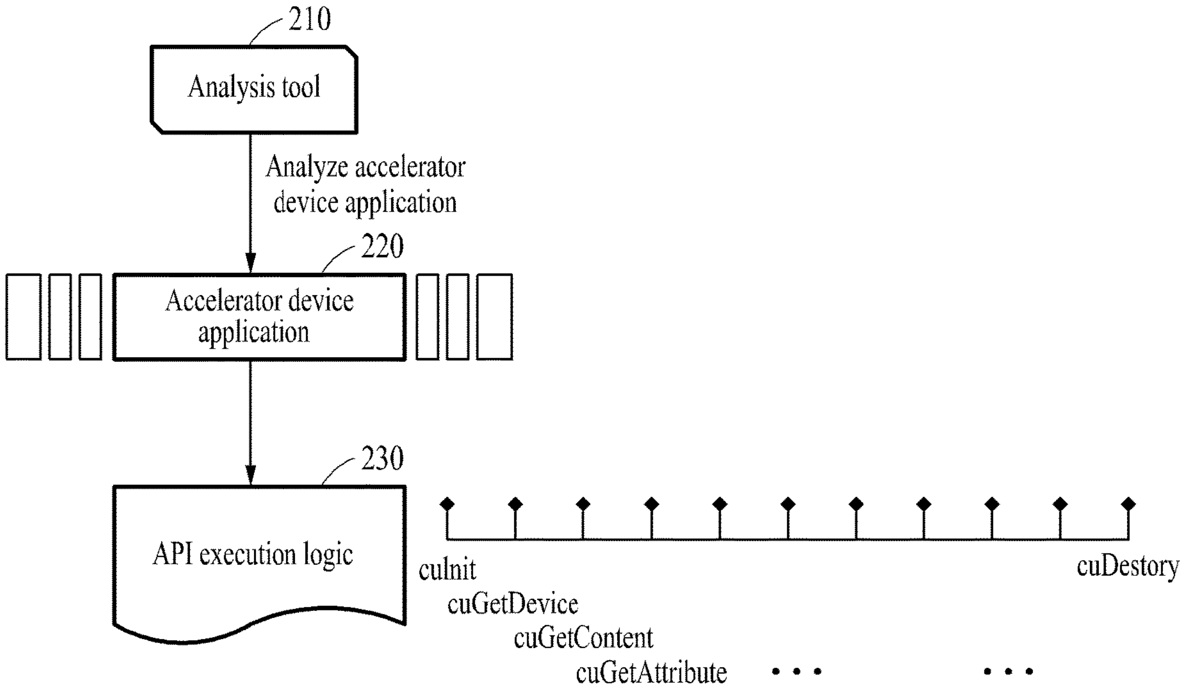
FIG. 2 illustrates an example of determining an application program interface (API) execution logic of an accelerator device application, according to one or more embodiments.

FIG. 2 illustrates an example of determining an API execution logic of an accelerator device application, according to one or more embodiments.

Referring to FIG. 2, the computing apparatus may obtain an API execution logic 230 by executing an accelerator device application 220 using an analysis tool 210. For example, the API execution logic 230 may include (i) indications of calls such as cuInit, cuGetDevice, cuGetContent, cuGetAttribute, cuDestroy, etc. (which may represent an order of API calls when the accelerator device executes the application) and (ii) a time required to execute each of the API calls.

Referring to FIG. 1 again, in operation 120, the computing apparatus may determine an initial checkpoint interval based on a mean time to failure (MTTF) statistic and a checkpoint cost. Here, the computing apparatus may determine the initial checkpoint interval of the accelerator device application with a conventional method. For example, the initial checkpoint interval of the accelerator device application may be determined according to Equation 1 below. However, examples are not limited thereto.

$$\Delta = \sqrt{2 * C * MTTF} \qquad \text{Equation 1}$$

Here, Δ denotes the initial checkpoint interval, C denotes the checkpoint cost, and MTTF denotes the mean time to failure.

In addition, the computing apparatus may determine the initial checkpoint interval of the accelerator device application according to Equation 2 below.

$$W(\Delta) = \frac{C}{\Delta} + \frac{\Delta}{2 * MTTF} \qquad \text{Equation 2}$$

Here, W(Δ) denotes a time (a determinable value) required to perform a checkpoint operation, Δ denotes the initial checkpoint interval, C denotes the checkpoint cost, and MTTF denotes the mean time to failure.

In other words, the initial checkpoint interval may be a constant checkpoint interval calculated by an equation such as Equation 1 or Equation 2. It should be understood that, in addition to the above-described methods of determining the initial checkpoint interval of an accelerator device application, one of ordinary skill in the art may use other suitable methods for the computing apparatus.

The high-load API described above may include an API call (e.g., a call in a low-level driver API) for copying data into the accelerator device and an API call for copying data out from the accelerator device. However, examples are not limited thereto. When the accelerator device application is a GPU application (e.g., a CUDA application), the API call for copying data into the accelerator device may be cuMemcpyHtoD and the API call for copying data out from the accelerator device may be cuMemcpyDtoH. However, examples are not limited thereto.

A predetermined checkpoint adjustment strategy is described below in detail with reference to FIG. 3.

Figure 3:
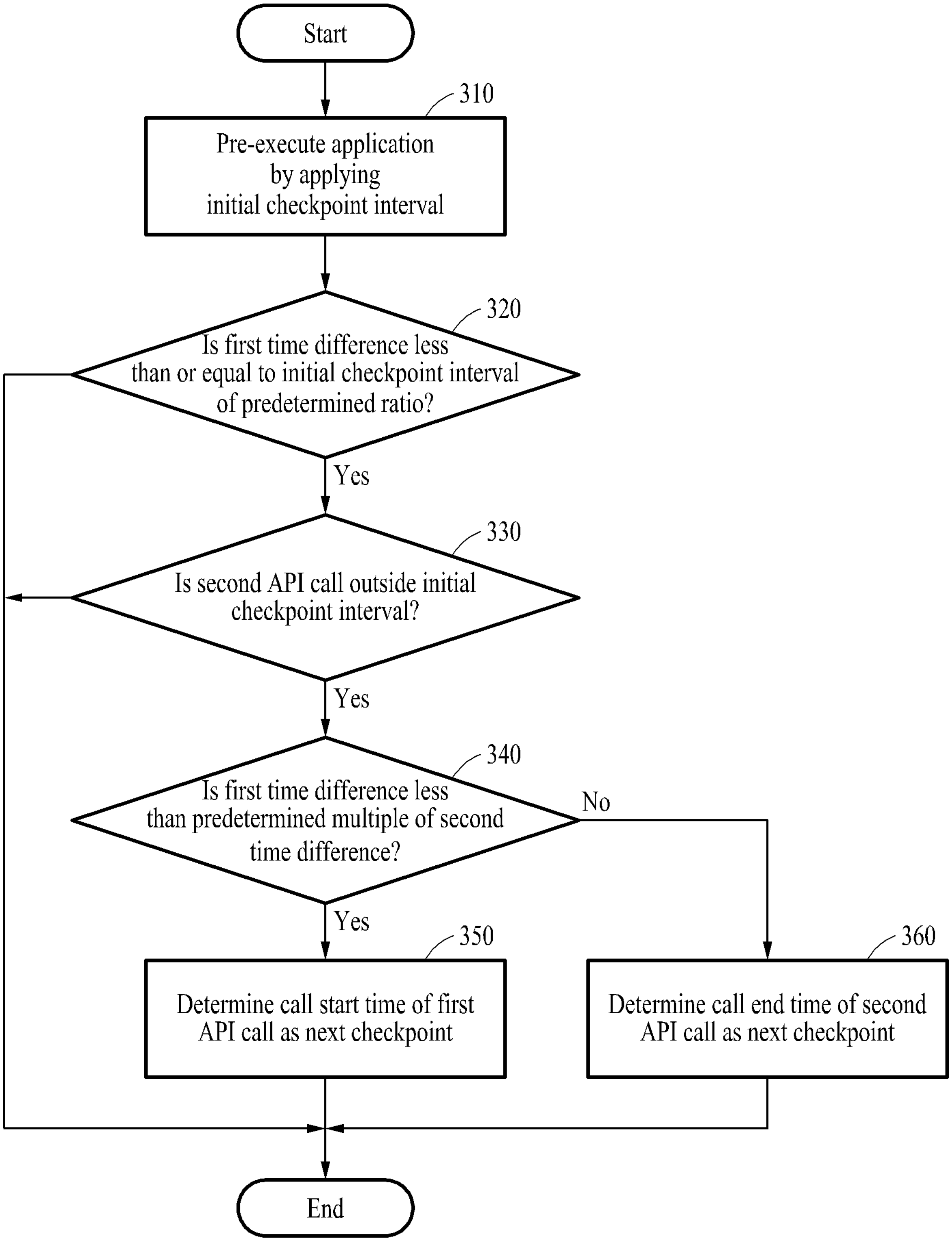
FIG. 3 illustrates an example of setting a checkpoint adjustment strategy, according to one or more embodiments.

FIG. 3 illustrates an example of setting a checkpoint adjustment strategy in an computing apparatus, according to one or more embodiments.

Referring to FIG. 3, in operation 310, the computing apparatus may pre-execute an application by applying an initial checkpoint interval, for example using an analysis tool (e.g., analysis tool 210).

Subsequently, in operation 320, the computing apparatus may check whether a first time difference is not greater than a predetermined ratio of the initial checkpoint interval. In this case, the first time difference may be, within a time interval between a first checkpoint and a second checkpoint, a time difference between a call start time of a first API call included in an execution cycle of the first API call within the time interval and a second checkpoint. The first API call may be the last API call that copies data into the accelerator device within the time interval between the first checkpoint and the second checkpoint.

When the first time difference is not greater than the predetermined ratio of the initial checkpoint interval according to the checking in operation 320, the computing apparatus may check, in operation 330, whether the second API call is not made within the initial checkpoint interval. In this case, the second API call may be the next API call, after the first API call, that copies data (e.g., results data) from the accelerator device.

When the second API call is not within the initial checkpoint interval according to the checking in operation 330, the computing apparatus may check whether the first time difference is less than a predetermined multiple of a second time difference in operation 340. In this case, the second time difference may be a time difference between the second checkpoint and a call end time of the second API call.

In operation 350, when the first time difference is less than the predetermined multiple of the second time difference according to the checking in operation 340, the computing apparatus may determine the call start time of the first API call as a next checkpoint. Operation 350 is described below with reference to FIG. 4.

When the first time difference is not less than the predetermined multiple of the second time difference according to the checking in operation 340, the computing apparatus may set the call end time of the second API call as a next checkpoint in operation 360. Operation 360 is described below with reference to FIG. 5.

Figure 4:
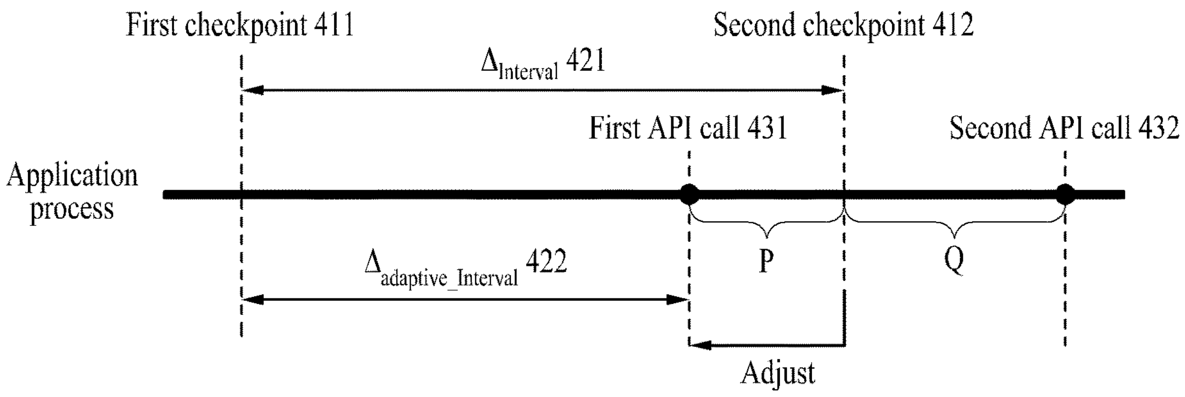
FIG. 4 illustrates an example of setting a checkpoint adjustment strategy for each API execution cycle including a high-load API, according to one or more embodiments.

FIG. 4 illustrates an example of setting a checkpoint adjustment strategy for each API execution cycle including a high-load API in a computing apparatus. The high-load API may be implemented, for example, as a CUDA driver API.

Referring to FIG. 4, when pre-executing an application with an initial checkpoint interval (ΔInterval) 421, the computing apparatus may, within a time interval (in the case of initial execution, the initial checkpoint interval (ΔInterval) 421) between a first checkpoint 411 and a second checkpoint 412, check (1) whether (i) a first time difference P between a call start time of a first API call 431 (that is included in an execution cycle of the first API call within the time interval) and a second checkpoint 412 is (ii) greater than a predetermined ratio of the initial checkpoint interval and check (2) whether the second API call 432 is within the initial checkpoint interval. Here, the first API call 431 may be the last API call that copies data into an accelerator device and that is within the time interval between the first checkpoint 411 and the second checkpoint 412. The second API call 432 may be the next API call (after the first API call), that copies data from the accelerator device. Here, the predetermined ratio may be 20% but is not limited thereto, and the ratio may be adjusted according to the actual situation.

Figure 6:
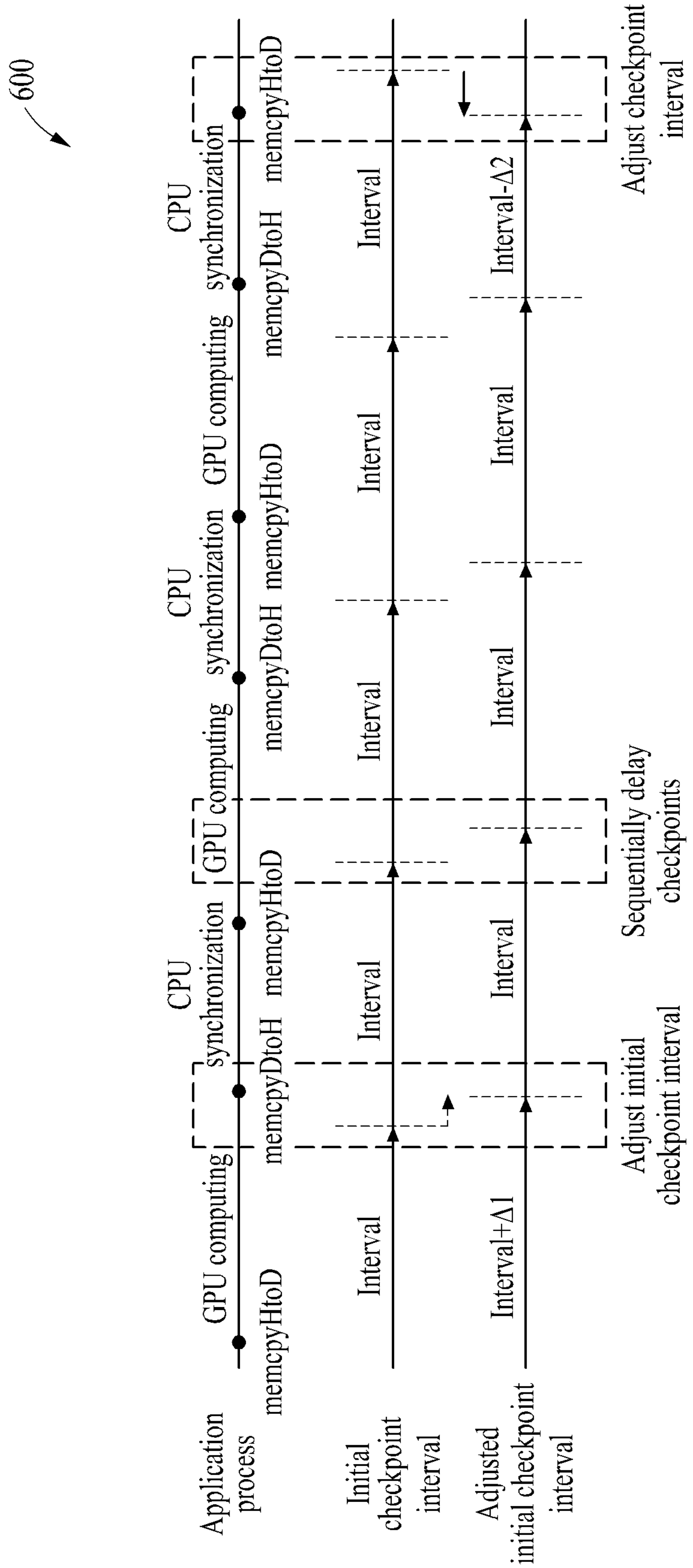
FIG. 6 illustrates an example of adjusting a checkpoint, according to one or more embodiments.

Incidentally, an example of an execution cycle is shown in FIG. 6. That is, the execution cycle may be one cycle or phase of GPU computation, which may be bracketed by cycle(s) of CPU synchronization.

When (1) (i) the first time difference P (the time difference between the call start time of the first API call 431 and the second checkpoint 412) is not greater than the predetermined ratio of the initial checkpoint interval and (ii) the second API call 432 is not within the initial checkpoint interval, and when (2) the first time difference P is less than a predetermined multiple of a second time difference Q (the time difference between the second checkpoint 412 and a call end time of the second API 432), the computing apparatus may set the call start time of the first API call 431 as a next checkpoint. That is, corresponding $\Delta_{adaptive\_interval}$ 422 of FIG. 4 may also be referred to as an adjusted checkpoint interval. Here, the predetermined multiple may be "2" times but is not limited thereto, and the predetermined multiple may be adjusted according to the actual situation.

Figure 5:
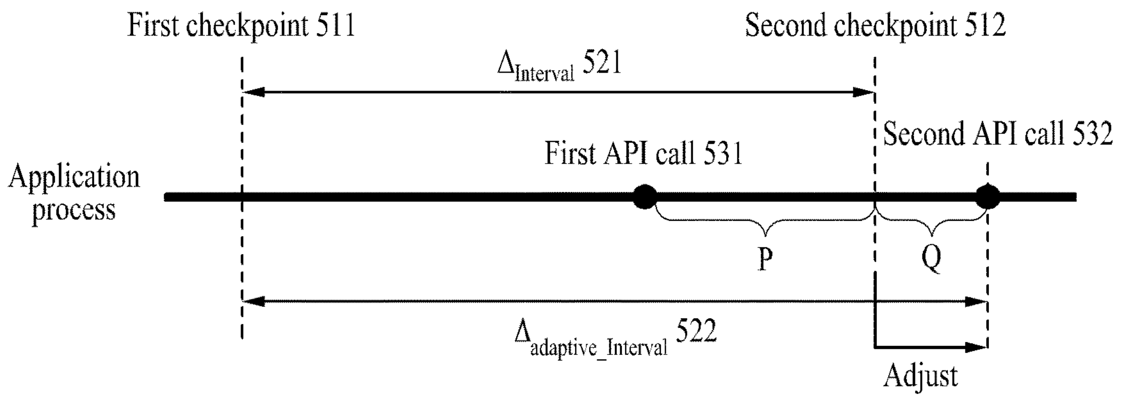
FIG. 5 illustrates another example of setting a checkpoint adjustment strategy for each API execution cycle including a high-load API, according to one or more embodiments.

FIG. 5 illustrates another example of setting a checkpoint adjustment strategy for each API execution cycle including a high-load API in an computing apparatus.

Referring to FIG. 5, when pre-executing an application with an initial checkpoint interval (ΔInterval) 521, the computing apparatus may, within a time interval (in the case of the initial execution, the initial checkpoint interval (ΔInterval) 521) between a first checkpoint 511 and a second checkpoint 512, (1) check whether a first time difference (a time difference between a call start time of a first API call 531 that is included in an execution cycle of the first API within the time interval and the second checkpoint 512) is greater than a predetermined ratio of the initial checkpoint interval and (2) check whether a second API call 532 is within the initial checkpoint interval. Here, the first API call 531 may be the last API call that copies data into an accelerator device within the time interval between the first checkpoint 511 and the second checkpoint 512. The second API call 532 may be an API that copies data from the accelerator device next to the first API call 531. Here, the predetermined ratio may be 20% but is not limited thereto, and the predetermined ratio may be adjusted according to the actual situation.

When (1) (i) the first time difference (the difference between the call start time of the first API call 531 in the execution cycle of the first API call 531 within the time interval and the second checkpoint 512) is not greater than a predetermined ratio of the initial checkpoint interval and (ii) the second API 532 is not within the initial checkpoint interval, and when (2) the first time difference P is not less than the predetermined multiple of a second time difference Q (a difference between the second checkpoint 512 and a call end time of the second API call 532), the computing apparatus may set the call end time of the second API call 532 as a next checkpoint. That is, corresponding $\Delta_{adaptive\_interval}$ 522 of FIG. 5 may also be referred to as an adjusted checkpoint interval. Here, the predetermined multiple may be "2" times but is not limited thereto, and may be adjusted according to the actual situation.

FIG. 6 illustrates an example 600 of adjusting a checkpoint in a computing apparatus, according to one or more embodiments.

Referring to FIG. 6, the computing apparatus may determine a next checkpoint based on a checkpoint adjustment strategy that may be determined according to an application process. The operations shown in FIG. 6 may be a continuation of FIG. 5, e.g., an execution of the application managed by a tool such as the analysis tool 210. That is, the computing apparatus may adjust an initial checkpoint interval in a way that is specific to the application. After adjusting the initial checkpoint interval (e.g., as done in FIG. 5), the computing apparatus may delay and adjust subsequent checkpoints sequentially. The adjusting may be done by the tool or by the application under control of the tool. It should be noted that, for example, as shown in FIG. 6, after a first checkpoint is adjusted by Δ1, subsequent checkpoints may sequentially be delayed accordingly. In addition, cuMemcpyHtoD and cuMemcpyDtoH shown in FIG. 6 are only examples of a high-load API calls and examples are not limited thereto.

Hereinafter, an apparatus according to the present disclosure operating as described above is described with reference to the drawings below.

Figure 7:
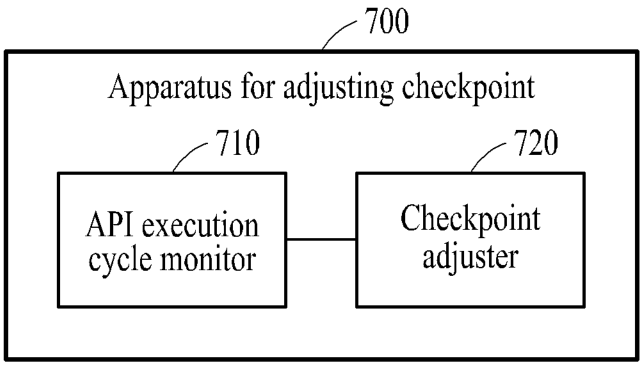
FIG. 7 illustrates an example of a configuration of an apparatus for adjusting a checkpoint, according to one or more embodiments.

FIG. 7 illustrates an example configuration of a computing apparatus.

Referring to FIG. 7, a computing apparatus 700 may include an API execution cycle monitor 710 and a checkpoint adjuster 720.

The API execution cycle monitor 710 may monitor API calls when an accelerator device executes an application and may check an API execution logic and a current API execution cycle of the application. Here, the API execution logic may include an order of API calls when the accelerator device executes the application and a time required to execute each of the API calls.

The checkpoint adjuster 720 may determine a next checkpoint according to a predetermined checkpoint adjustment strategy that is based on the API execution logic and the current API execution cycle of the application. Here, the predetermined checkpoint adjustment strategy may correspond to at least one API execution logic among multiple API execution logics. The predetermined checkpoint adjustment strategy may determine the next checkpoint (for at least one API execution cycle) based on the API execution logic of the application executed by the accelerator device and based on an initial checkpoint interval. Here, the at least one API execution cycle may include calls to a high-load API for copying data to/from the accelerator device. In addition, the initial checkpoint interval may be determined based on an MTTF and a checkpoint cost. In addition, the high-load API may include an API call for copying data into the accelerator device and an API call for copying data from the accelerator device.

The computing apparatus 700 may further include a checkpoint adjustment strategy determining unit (not shown). The checkpoint adjustment strategy determining unit may pre-execute the application with the initial checkpoint interval and, when (1) (i) a first time difference is not greater than a ratio (proportion) of the initial checkpoint interval of and (ii) a second API call is not within the initial checkpoint interval, and when (2) the first time difference is less than a predetermined multiple of a second time difference, the computing apparatus 700 may set a call start time of a first API call as a next checkpoint.

In addition, the checkpoint adjustment strategy determining unit may, when (1) the first time difference is not greater than the predetermined ratio of the initial checkpoint interval and the second API is not within the initial checkpoint interval, and when (2) the first time difference is greater than or equal to a predetermined multiple of a second time difference, set a call end time of the second API call as a next checkpoint.

Here, the first time difference may be, within a time interval between a first checkpoint and a second checkpoint, a time difference between (i) the call start time of the first API call (which is included in an execution cycle of the first API call within the time interval) and (ii) the second checkpoint. The second time difference may be a time difference between the second checkpoint and the call end time of the second API call. The first API call may be a last API call that copies data into the accelerator device and that is within the time interval between the first checkpoint and the second checkpoint. The second API call may be an API call that copies data from the accelerator device and that is next to the first API call (i.e., most immediately follows the first API call).

In addition, the predetermined ratio may be 20% and the predetermined multiple may be "2" times. However, examples are not limited thereto, and the predetermined ratio and the predetermined multiple may be adjusted according to the actual situation. In addition, when the accelerator device is a GPU (e.g., a CUDA GPU), the API call for copying data into the accelerator device may be cuMemcpyHtoD and the API call for copying data from the accelerator device may be cuMemcpyDtoH. However, examples are not limited thereto.

Figure 8:
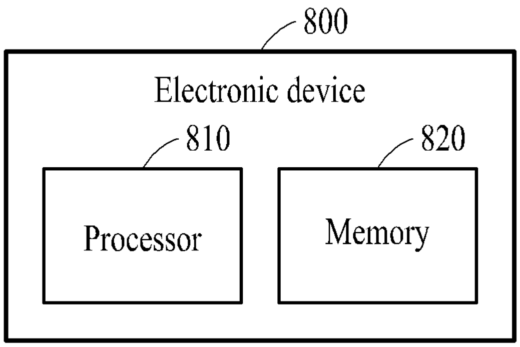
FIG. 8 illustrates a configuration of an electronic device for adjusting a checkpoint, according to one or more embodiments.

FIG. 8 illustrates a configuration of an electronic device for adjusting a checkpoint, according to one or more embodiments.

Referring to FIG. 8, an electronic device 800 may include a processor 810 and a memory 820.

The processor 810 may perform an operation of the API execution cycle monitor 710 of FIG. 7, the checkpoint adjuster 720, and the checkpoint adjustment strategy determining unit (not shown).

The memory 820 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM (EPROM), flash memory, hard disks, optical disks, and magnetic tapes.

The memory 820 may store an operating system for controlling the overall operation of the electronic device 800, application programs, and data for storage. In addition, the memory 820 may store information on an API execution logic and a current API execution cycle of an application that are obtained in a process of monitoring the API according to the present disclosure and may store a predetermined checkpoint adjustment strategy.

The computing apparatuses, the electronic devices, the processors, the memories, the displays, the information output system and hardware, the storage devices, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of adjusting a checkpoint, the method comprising:

monitoring calls of an application program interface (API) that are called when an accelerator device executes an application, and by the monitoring, checking an API execution logic and a current API execution cycle of the application with respect to the accelerator device; and determining a next checkpoint according to a checkpoint adjustment strategy that determines the next checkpoint based on the API execution logic and based on the current API execution cycle of the application, wherein the checkpoint adjustment strategy corresponds to at least one API execution logic among plural API execution logics, wherein the checkpoint adjustment strategy is set by:

pre-executing the application with an initial checkpoint interval to obtain the API execution logic; and determining, based on the API execution logic and the initial checkpoint interval, an adjusted checkpoint interval that defines a timing of the next checkpoint, and wherein the adjusted checkpoint interval is determined by comparing a call time of an API call for copying data to or from the accelerator device with respect to the initial checkpoint interval, and based on the comparison, setting the next checkpoint to the call time of the API call within the current API execution cycle.

2. The method of claim 1, wherein the checkpoint adjustment strategy is determined on at least one API execution cycle based on the API execution logic of the application executed by the accelerator device and the initial checkpoint interval.

3. The method of claim 2, wherein the at least one API execution cycle comprises an API for copying data to or from the accelerator device.

4. The method of claim 1, wherein the API execution logic of the application comprises an order of API calls when the accelerator device executes the application and a time required to execute each of the API calls.

5. The method of claim 2, wherein the initial checkpoint interval is determined based on a mean time to failure (MTTF) and a checkpoint cost.

6. The method of claim 2, further comprising setting the checkpoint adjustment strategy, wherein the setting of the checkpoint adjustment strategy comprises:

pre-executing the application with the initial checkpoint interval; and setting, when a first time difference is not greater than a predetermined ratio of the initial checkpoint interval and a second API call is not within the initial checkpoint interval, when the first time difference is less than a predetermined multiple of a second time difference, a call time of a first API call as a next checkpoint, wherein, within a time interval between a first checkpoint and a second checkpoint, the first time difference is a time difference between the call time of the first API call and the second checkpoint, the second time difference is a time difference between the second checkpoint and a call end time of the second API call, the first API call is a last API call that copies data into the accelerator device within the time interval between the first checkpoint and the second checkpoint, and the second API call is a next API call after the first API call that copies data from the accelerator device.

7. The method of claim 2, further comprising setting the checkpoint adjustment strategy, wherein the setting of the checkpoint adjustment strategy comprises:

pre-executing the application with the initial checkpoint interval; and setting, when a first time difference is not greater than a predetermined ratio of the initial checkpoint interval, when a second API call is not within the initial checkpoint interval, and when the first time difference is greater than or equal to a predetermined multiple of a second time difference, a call time of the second API call as a next checkpoint, wherein, within a time interval between a first checkpoint and a second checkpoint, the first time difference is a time difference between the call time of the first API call and the second checkpoint, the second time difference is a time difference between the second checkpoint and a call end time of the second API call, the first API call is a last API call, within the time interval between the first checkpoint and the second checkpoint, that copies data into the accelerator device, and the second API call is a next API call after the first API call that copies data from the accelerator device.

8. The method of claim 3, wherein the API comprises an API function for copying data into the accelerator device and an API function for copying data from the accelerator device.

9. The method of claim 8, wherein, when the accelerator device is a graphics processing unit (GPU) and the application is a GPU application, the API function for copying data into the accelerator device is cuMemcpyHtoD, and the API function for copying data from the accelerator device is cuMemcpyDtoH.

10. The method of claim 1, wherein the accelerator device comprises a CUDA GPU, and wherein a checkpoint of the CUDA GPU is performed according to the next checkpoint.

11. An apparatus for adjusting a checkpoint, the apparatus comprising:

one or more processors;

memory storing instructions configured to be executed by the one or more processors to cause the one or more processors to:

monitor an application program interface (API) execution cycle configured to identify calls to the API that are made when an accelerator device executes an application and check an API execution logic and a current API execution cycle of the application;

determine a next checkpoint according to a checkpoint adjustment strategy based on the API execution logic and the current API execution cycle of the application; and according to the determined next checkpoint, perform a checkpoint of the application, including checkpointing data stored in the accelerator device, wherein the checkpoint adjustment strategy is set by:

pre-executing the application with an initial checkpoint interval to obtain the API execution logic; and determining, based on the API execution logic and the initial checkpoint interval, an adjusted checkpoint interval that defines a timing of the next checkpoint, and wherein the adjusted checkpoint interval is determined by comparing a call time of an API call for copying data to or from the accelerator device with respect to the initial checkpoint interval, and based on the comparison, setting the next checkpoint to the call time of the API call within the current API execution cycle.

12. The apparatus of claim 11, wherein the checkpoint adjustment strategy is determined on at least one API execution cycle based on the API execution logic of the application and an initial checkpoint interval.

13. The apparatus of claim 12, wherein the at least one API execution cycle comprises an API for copying data to and from the accelerator device.

14. The apparatus of claim 11, wherein the API execution logic of the application comprises an order of calls to the API when the accelerator device executes the application and a time required to execute each of the API calls.

15. The apparatus of claim 12, wherein the initial checkpoint interval is determined based on a mean time to failure (MTTF) and a checkpoint cost.

16. The apparatus of claim 12, wherein the instructions are further configured to cause the one or more processors to pre-execute the application with the initial checkpoint interval and, when a first time difference is not greater than a predetermined ratio of the initial checkpoint interval and a second API call is not within the initial checkpoint interval, when the first time difference is less than a predetermined multiple of a second time difference, set a call start time of a first API call as a next checkpoint, wherein, within a time interval between a first checkpoint and a second checkpoint, the first time difference is a time difference between the call start time of the first API call that is included in an execution cycle of the first API call within the time interval and the second checkpoint, the second time difference is a time difference between the second checkpoint and a call end time of the second API call, the first API call is a last API call that, within the time interval between the first checkpoint and the second checkpoint, copies data into the accelerator device, and the second API call is a next API call after the first API call that copies data from the accelerator device.

17. The apparatus of claim 16, wherein when a first time difference is not greater than the predetermined ratio of the initial checkpoint interval ef and a second API call is not within the initial checkpoint interval, and when the first time difference is greater than or equal to a predetermined multiple of a second time difference, a call time of the second API call is set as a next checkpoint.

18. The apparatus of claim 13, wherein the API comprises a function for copying data into the accelerator device and a function for copying data from the accelerator device.

19. The apparatus of claim 18, wherein, when the application executed by the accelerator device is a graphics processing unit (GPU), the function for copying data into the accelerator device is cuMemcpyHtoD, and the function for copying data from the accelerator device is cuMemcpyDtoH.

20. A non-transitory computer-readable medium storing instructions that, when executed by one or more processors, cause the one or more processors to perform operations for adjusting a checkpoint, the operations comprising:

monitoring calls of an application program interface (API) that are called when an accelerator device executes an application, and by the monitoring, checking an API execution logic and a current API execution cycle of the application with respect to the accelerator device; and determining a next checkpoint according to a checkpoint adjustment strategy that determines the next checkpoint based on the API execution logic and based on the current API execution cycle of the application, wherein the checkpoint adjustment strategy corresponds to at least one API execution logic among plural API execution logics, and wherein the checkpoint adjustment strategy is set by:

pre-executing the application with an initial checkpoint interval to obtain the API execution logic; and determining, based on the API execution logic and the initial checkpoint interval, an adjusted checkpoint interval that defines a timing of the next checkpoint, wherein the adjusted checkpoint interval is determined by comparing a call time of an API call for copying data to or from the accelerator device with respect to the initial checkpoint interval, and based on the comparison, setting the next checkpoint to the call time of the API call within the current API execution cycle.

* * * * *